US008869070B2

(12) United States Patent
Singh

(10) Patent No.: US 8,869,070 B2
(45) Date of Patent: Oct. 21, 2014

(54) HANDWRITING MANIPULATION FOR CONDUCTING A SEARCH OVER MULTIPLE DATABASES

(75) Inventor: Amanjot Singh, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1099 days.

(21) Appl. No.: 12/346,680

(22) Filed: Dec. 30, 2008

(65) Prior Publication Data

US 2010/0169841 A1   Jul. 1, 2010

(51) Int. Cl.
*G06F 3/048* (2013.01)
*G06F 3/0488* (2013.01)
*G06F 17/30* (2006.01)

(52) U.S. Cl.
CPC ...... *G06F 3/04883* (2013.01); *G06F 17/30967* (2013.01)
USPC .......................................................... 715/863

(58) Field of Classification Search
USPC ........................................... 345/173; 715/863
See application file for complete search history.

(56) References Cited

U.S. PATENT DOCUMENTS

| 5,864,635 | A * | 1/1999 | Zetts et al. ..................... 382/187 |
| 2003/0028851 | A1* | 2/2003 | Leung et al. .................. 715/541 |
| 2005/0219226 | A1* | 10/2005 | Liu et al. ........................ 345/173 |
| 2006/0013487 | A1* | 1/2006 | Longe et al. .................. 382/229 |
| 2007/0198948 | A1* | 8/2007 | Toriyama ....................... 715/790 |
| 2009/0005088 | A1* | 1/2009 | Hsu ................................. 455/466 |
| 2009/0113444 | A1* | 4/2009 | Hackborn et al. ............. 719/312 |
| 2010/0161594 | A1* | 6/2010 | Prasad et al. ................... 707/722 |

* cited by examiner

*Primary Examiner* — Matt Kim
*Assistant Examiner* — William Trapanese
(74) *Attorney, Agent, or Firm* — Perkins Coie LLP

(57) ABSTRACT

A method and system is provided for allowing a user of a multifunctional device to search information without going through several menu/button manipulations. More specifically, a multifunctional device comprises a user screen area including a touch sensitive layer to receive user input in order to initiate a search over several local and/or remote databases. The user is allowed to input a free-style handwriting query on a screen of a device to look up information, such as contact information, available applications, wallpapers, ringtones, photos, call logs, etc. After conducting a search, the device presents the search results to the user in such a way that the user can start an intended operation by selecting a search result, such as making a call, starting an application, etc.

25 Claims, 10 Drawing Sheets

HANDWRITING MANIPULATION FOR CONDUCTING A SEARCH OVER MULTIPLE DATABASES

BACKGROUND

Electronic devices, in particular, portable or mobile electronic devices, are becoming increasingly popular and equipped with diverse functionalities. For example, phone devices such as mobile phones, smart phones, landline phones, VoIP phones, and all manner of fixed and mobile telecommunications devices, media players, and gaming devices, which are now in wide-spread use, are becoming "multifunctional devices" that have cameras, text messaging capability, Internet browsing capability, electronic mail capability, video playback capability, audio playback capability, image display capability, phone capability and so forth. Typically, such multifunctional devices interact with a user with one or more graphic user interface (GUI) screens with objects (e.g., icons and menu options) to allow a user to use the various features of the multifunctional devices.

However, as electronic devices become more compact and provide more diverse functionalities, it is very common that a user has to go through more GUI menu options to select the functionality that the user wishes to perform at the moment. For example, if a mobile phone user wants to make a call to a friend while the user is using the device to browse the Internet, the user typically needs to close or minimize the browser application, find a GUI object (such as phonebook or call log) to start a search for contact information, enter a character or phone number for a search query, and select a menu or press a button to obtain search results (e.g., a list of contact information). The user must then select an item from the search results to make a phone call. This is very tedious, time consuming and inconvenient to the device user. For another example, if a device user wants to find a text message from a friend while an email application is running on a mobile phone, the user must navigate through several steps to return to a main menu, and then find and launch a GUI object associated with the text message box.

Accordingly, there is a need for a simple and efficient way to search for a desired application or information without going through several menu/button manipulations.

SUMMARY

A method and system are provided for allowing a user of a multifunctional device or computing device, including all manner of mobile phones, personal digital assistants, computers, home messaging hubs, media players, gaming devices, computers, and other devices that are enabled to perform more than one functions, to search for applications and/or information, such as contact information, gaming applications, wallpapers, ringtones, songs, videos, photos, call logs, etc., by inputting a free-style handwriting query on a device's touch sensitive screen. The device recognizes the free-style handwriting input as the initiation of a search, converts the handwriting input into a search query using handwriting recognition, conducts the search and displays search results to the user in such a way that the user can access information and/or start one or more intended operations by selecting one or more search results. Such intended operations may include making a call, launching an application, viewing a photo, playing a media file, etc.

In accordance with an aspect of one embodiment, a computer implemented method is provided for a handwriting-initiated search. The computer implemented method includes receiving user handwriting input on a device's touch sensitive screen, processing the user handwriting input to determine a matching character or characters, and conducting a search over one or more databases based on the matching character (s). Search results are obtained from the search. Search results may be presented in a first window (e.g., a new window or a drop-down window) displaying the search results, or as objects so that the user can select one or more search results to access information and/or perform an action or actions associated with the search result(s).

In accordance with another aspect, a computing device is provided for performing a handwriting-initiated search. The computing device comprises at least a touch sensitive input unit for receiving user input; a memory unit for storing a plurality of databases; a processor that is operable to determine that the received user input is a handwriting user input and, in response to the handwriting user input, to process the handwriting user input to find a matching character or characters; and a display unit. The processor is operable to conduct a search over the plurality of databases based on the matching character(s), obtain search results from the search and formulate a graphical user interface displaying the search results. The display unit displays the formulated graphical user interface where each displayed search result is selectable by the user for performing an action associated with the search result. In an embodiment, the display unit and the touch sensitive input unit may be integrated in such a manner that the user perceives them as one and the same. In an embodiment, the display unit and the touch sensitive input unit may be separately integrated into the computing device such that the user perceives them as separate interfaces.

In accordance with yet another aspect, a computer-readable medium having instructions encoded thereon to conduct a search based on a handwritten search query is provided. The instructions, when executed by a computing device, cause the computing device to receive user input through a touch sensitive input unit or a first window displayed on a touch sensitive display of the computing device and determine whether the received user input is a handwritten search query or a selection of a GUI object. Upon recognizing and in response to the handwritten search query, the computing device is operable to conduct a search over databases based on the handwritten search query, lock the first window to preserve a current status of the first window and present a second window displaying search results obtained from the search over the first window, the displayed search results being selectable by the user for performing an action or actions associated with a search result. The computing device is further operable to receive user selection of one or more search results and perform an action or actions associated with the search results.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present invention relate to a method and system for allowing a user of a multifunctional device to search for information, such as contact information, wallpaper information, ringtones, songs, videos, photos, call logs, etc., or for applications, such as gaming applications, word processing applications, media playing applications, etc., by inputting a free-style handwriting query on a device's touch sensitive screen. More specifically, embodiments of the present invention relate to a multifunctional device that comprises a user screen area including a touch sensitive layer to receive user input that initiates a search over several local or remote databases. In one embodiment, a user is allowed to input a free-style handwriting query on a screen of a device to look up information, such as contact information, wallpapers, ringtones, songs, videos, photos, call logs, or applications, such as gaming applications, word processing applications, media playing applications, etc. After conducting a search, the device presents the search results to the user in such a way that the user can access information and/or initiate one or more intended operations by selecting one or more search results. Such intended operations may include making a call, launching an application, viewing a photo, playing a media file, etc.

The terminology used in the description presented below is intended to be interpreted in its broadest reasonable manner, even though it is being used in conjunction with a detailed description of certain specific embodiments. Certain terms may even be emphasized below; however, any terminology intended to be interpreted in any restricted manner will be overtly and specifically defined as such in this Detailed Description section.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. The following description provides specific details for an enabling description and a thorough understanding of these embodiments. One skilled in the art will understand, however, that the described embodiments may be practiced without many of these details. Additionally, some well-known structures or functions may not be shown or described in detail, so as to avoid unnecessarily obscuring the relevant description of the various embodiments.

Figure 1:
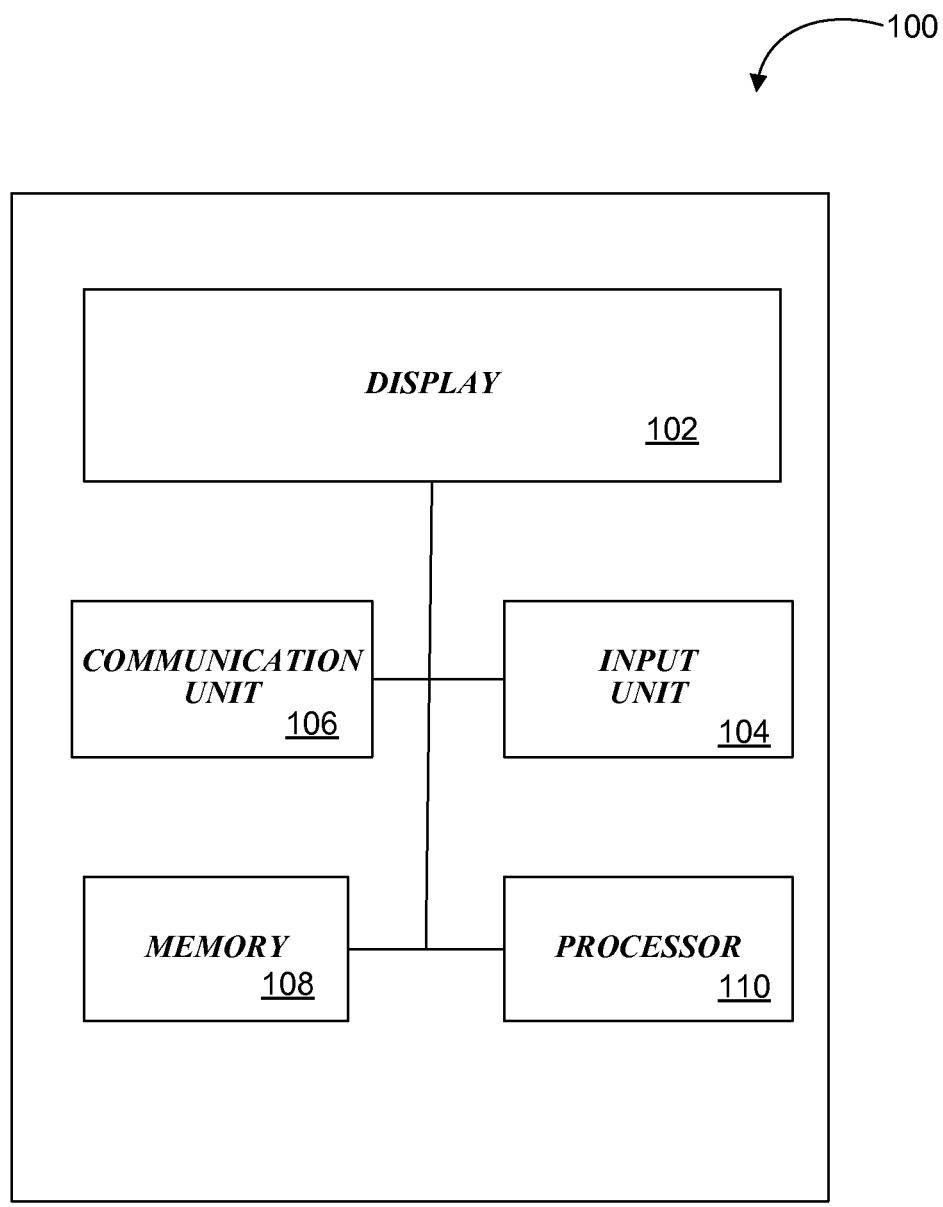
FIG. 1 is a general block diagram of an exemplary device in accordance with some embodiments.

Referring to FIG. 1, the following is intended to provide a general block diagram of an exemplary multifunctional device 100 in accordance with some embodiments. In one aspect, the multifunctional device 100 is typically a computing device including a variety of configurations or forms such as, but not limited to, laptop or tablet computers, personal digital assistants (PDAs), hybrid PDA/mobile phones, mobile phones, smart phones, media players, home messaging hub devices, digital picture frame devices, and the like. The multifunctional device 100 includes a processor 110 (controller), an input unit 104, and a memory 108. The processor 110 is configured to execute instructions and to carry out operations associated with the multifunctional device and one or more memory units for storing applications, operating system, databases, etc. In some embodiments, the processor 110 together with an operating system manages the hardware and software resources of the multifunctional device 100. The operating system includes Symbian OS, Microsoft Windows Mobile OS, OS/2, Unix, Linux, Palm OS, OS X, a special purpose operating system, and the like. The operating systems are generally well known in the art and will not be described in further detail. The multifunctional device also includes a display unit 102 such as a liquid crystal display (LCD), a light emitting polymer display (LPD), or the like.

The input unit 104 is configured to receive user input for selecting GUI objects or for manipulating the multifunctional device 100. As used herein, the term a "GUI object" refers to any screen object that is selectable by user input received through a touch sensitive input device or screen. The examples of the "GUI object" include, but are not limited to, visual indicators, icons, memo options, menu objects, command buttons, hypertext links, etc. The input unit 104 may include a touch sensitive layer of the screen that is configured to receive input from the user. In typical embodiments, the touch sensitive layer is configured to recognize a user's touches applied to the surface of the layer. For example, the position of the touches, the pressure of the touches, general direction of the touches, and the like are recognized by the touch sensitive layer (the input unit 104). In other embodiments, the input unit 104 comprises a touch sensitive input unit that is separate from the display unit 102. When the handwriting user input is detected on the input unit 104, the user input is processed so that the handwriting can be properly interpreted as a character or a symbol. The input unit 104 may also include separate soft keyboards (e.g., QWERTY, etc.), physical keyboards, physical buttons, scroll wheels, track balls, or the like.

The memory 108 depicted in FIG. 1 is one example of computer-readable media suited to storing data and program modules for implementing aspects of described embodiments. As used herein, the term "computer-readable media" includes volatile and non-volatile and removable and non-removable memory, implemented in any method or technology capable of storing information, such as computer-readable instructions, data structures, program modules, or other data. By way of example, computer-readable media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processor 110.

The multifunctional device 100 may further include a communication unit 106 for communicating with other devices or networks. The communication unit 106 may include one or more communication circuitry for permitting wireless communication over one or more of the IEEE 802.11 networks, 3G networks, wired networks, private networks and the like.

In this regard, the communication unit 106 covers communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS) communication band), WiFi® (IEEE 802.11) band, Bluetooth® band and the like. In some embodiments, the communication unit 106 may include other circuitry necessary to support one or more of following: the Global System for Mobile communications (GMS) standard, General Packet Radio Service (GPRS) standard, Enhanced Digital GSM Evolution (EDGE), or Evolution of GSM (E-GSM) standard, Code Division Multiple Access (CDMA), Wideband Code Division Multiple Access (WCDMA or W-CDMA) standard, Orthogonal Frequency Division Multiplex (OFDM) standard, Time Division Multiple Access (TDMA) standard, and the other standards.

It should be understood that the communication unit 106 may comprise other components, including, but not limited to, radio-frequency (RF) transceiver circuitry, power amplifier circuitry, passive RF components, antennas, and the like for handling RF signals.

While the aforementioned embodiments and examples are illustrated and described in connection with FIG. 1, it will be appreciated that various changes can be made therein without departing from the scope of the described embodiments.

Figure 2:
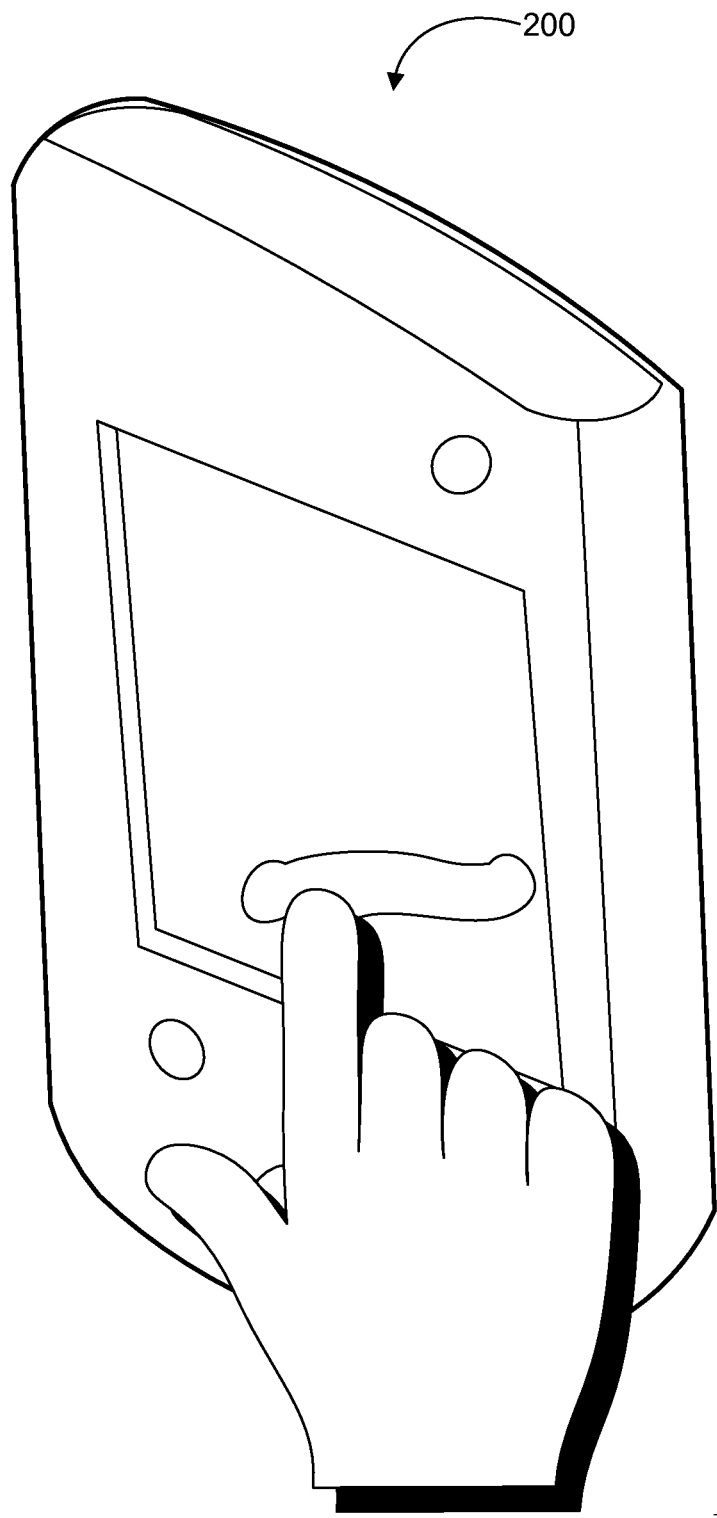
FIG. 2 is a schematic diagram of a device where a user can input a free-style handwritten search query in accordance with some embodiments.

FIG. 2 depicts a use of a device 200 when a user initiates a search by inputting a free-style handwritten search query on a touch sensitive screen. As shown, to initiate a search, a user may start writing a character(s) (a search query for a search) on the touch sensitive screen or pad of the device using the user's finger, a stylus, or the like. The terms "handwritten" or "handwriting" include any and all types of touch-sensitive interactions with a device, commonly initiated via a touch screen or touch pad, that require the device to interpret and/or translate one or more inputted characters. The term "character" includes any and all alphanumeric characters, symbols, glyphs, designs, drawings, or other images that may be drawn. In one embodiment, regardless of the current operating state of the device, the device is able to detect and process the user input received via a touch sensitive screen or pad and determine whether the user input is handwritten input or not. Since the determination processes will be described in further detail below in connection with FIGS. 8 and 9, the determination processes will only be briefly discussed here. Generally described, if the device determines that the user input is intended to select a GUI object from the GUI screen, the multifunctional device performs an action associated with the selected GUI object. If the device determines that the user input is handwriting input, the device processes the user input so that the user's handwriting can be interpreted as one or more characters. In one embodiment, the best matching character(s) may be determined from the user's handwriting. In this regard, some form of handwriting recognition is performed during the processing. For example, in some embodiments, handwriting recognition software including, but not limited to, CalliGrapher, Graffiti®, and the like may be used for recognizing and/or processing a user's handwriting. As will be understood, handwriting recognition is well known to one of skill in the art, and thus a detailed description of the handwriting recognition process is omitted in the description.

Figure 3:
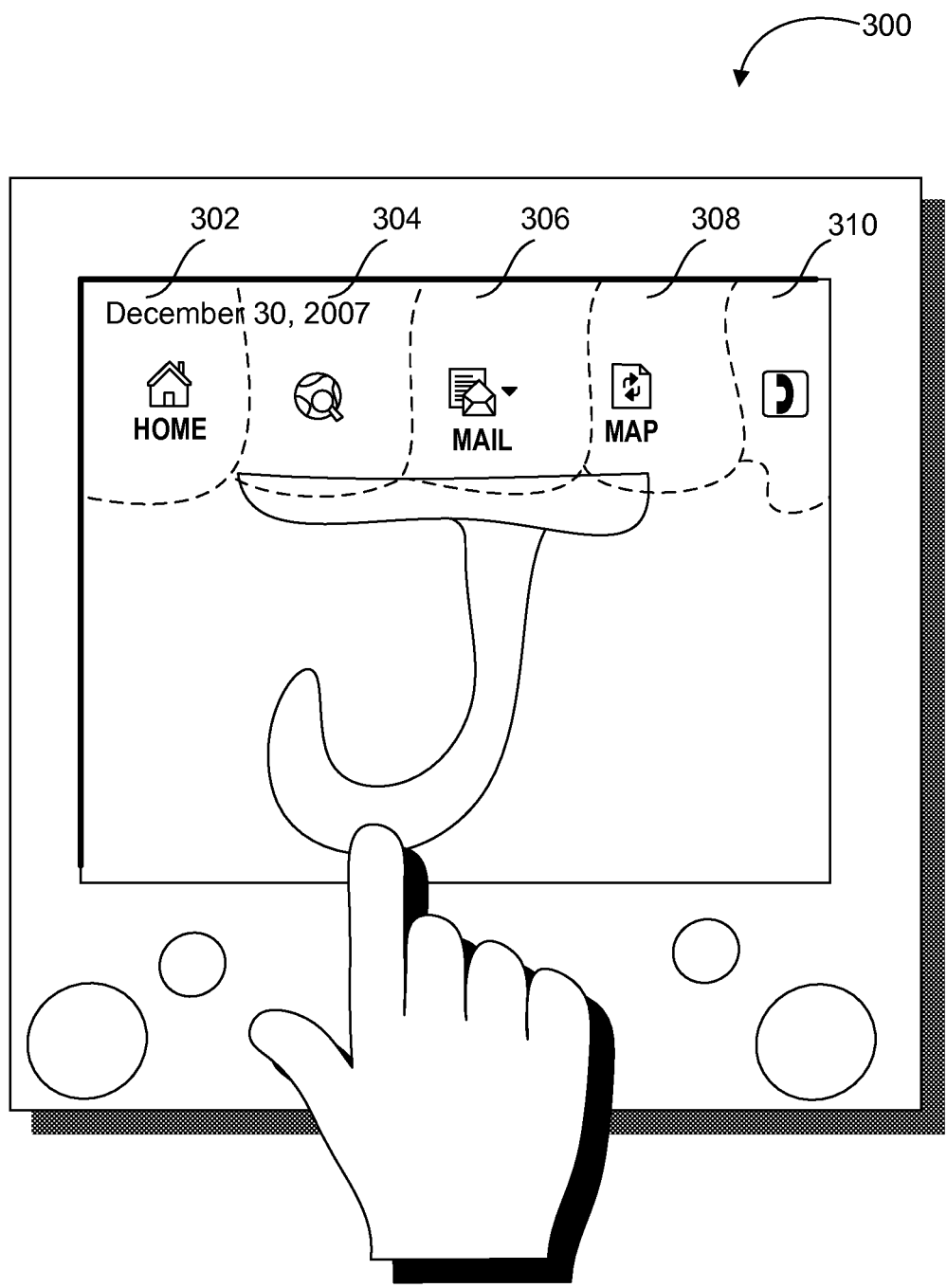
FIG. 3 is an exemplary screen display of a device when a user initiates a search by handwriting a character as a search query in accordance with some embodiments.

In one embodiment, the device may determine that a user input constitutes the initiation of a free-style handwriting query instead of selection of a GUI object if the input is initiated and proceeds over two or more GUI objects within a short period of time. FIG. 3 depicts an exemplary screen display wherein the user has initiated writing a letter "J" on a screen by first swiping across several GUI objects 302, 304, 306, 308 displayed at the top of the display. Since multiple GUI objects have been contacted, the method/system determines that a handwritten character has been inputted for initiating a search. Subsequently, the device processes the user input and determines a best matching character or symbol.

After the best matching character or symbol is determined, the device may conduct a search over various databases using the character as a search query (hereinafter, "handwritten search query"). Search results based on the handwritten search query are returned and presented to the user. In a typical embodiment, the device may conduct a search over multiple local databases, including contact information, applications, wallpapers, ringtones, photo album, media files (e.g., songs, videos, audio clips, etc.), other user history information (e.g., call logs, browsing history, etc.), email messages and text messages that are stored locally, and the like. The device may also conduct a search over remote databases maintained by a service provider or the like, including a voice/text message database, email message database, photo albums uploaded by the user, contact information, and the like.

After the device obtains the search results based on the handwritten search query, a GUI presenting the obtained search results is formulated and displayed. Such search results may be presented in a variety of ways, such as in a window overlaying or replacing a home screen, application, etc., or as a superimposition of search results as GUI objects over a home screen, application, etc. In one embodiment, each search result may be represented with a corresponding GUI object that a user can select in order to view information and/or to initiate (or launch) applications and/or actions. For example, in response to a user's selection of a GUI object representing a search result, the device may retrieve information about an application associated with the selected GUI object and launch the application accordingly.

Figure 4:
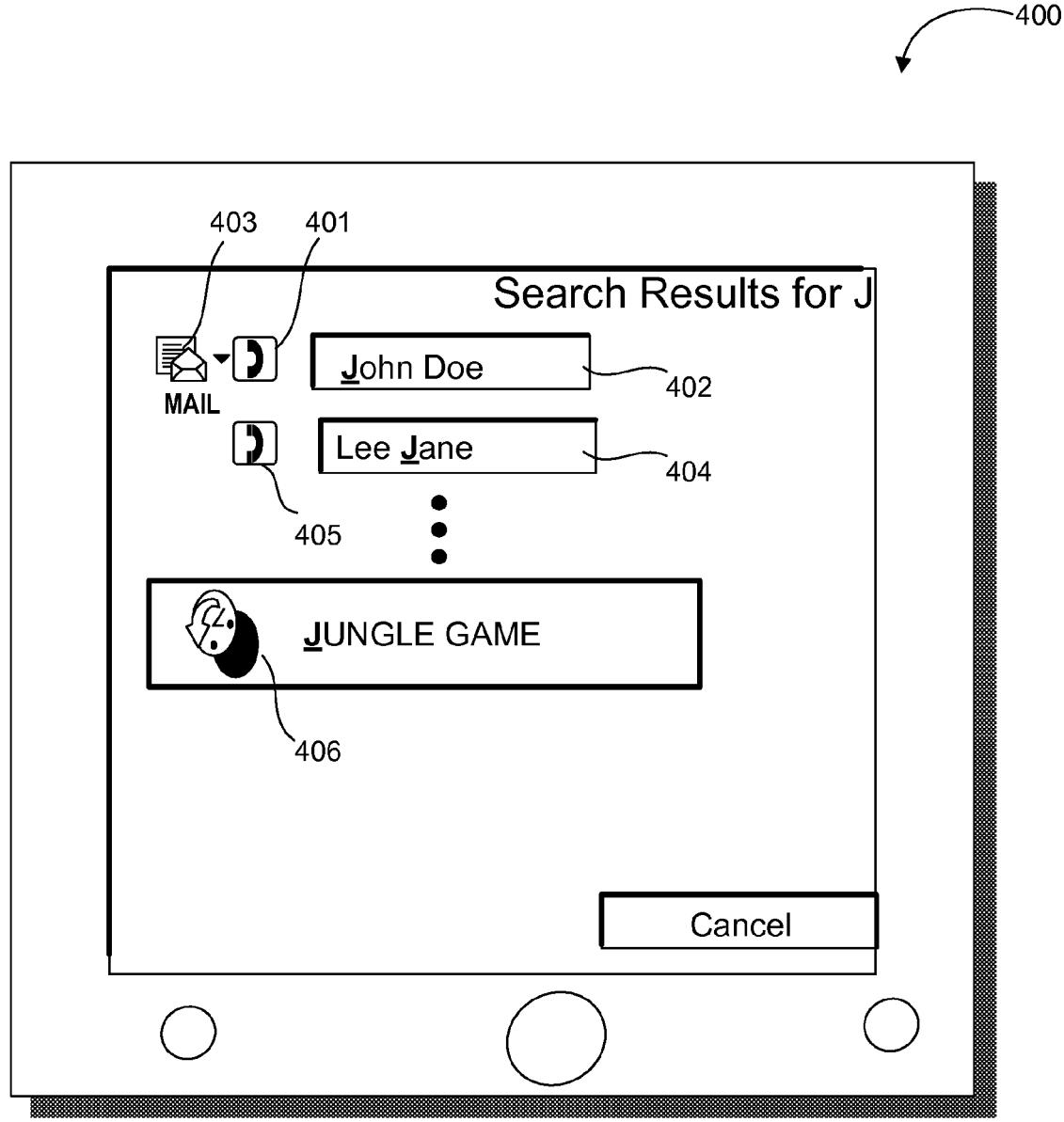
FIG. 4 is an exemplary screen display of a device that presents search results that are returned from a search based on the search query shown in FIG. 3 in accordance with some embodiments.

By way of example, if the search results include contact information associated with first or last names starting with "J" (e.g., telephone numbers of "John Doe" and "Lee Jane" and an email address of "John Doe"), the device presents one or more graphic objects 401, 403, 405 for each contact 402, 404 from the search results as illustrated in FIG. 4. As shown, "John Doe" 402 can be reached by phone or email and "Lee Jane" 404 can be reached by phone. The user may initiate a telephone call to, for instance, "John Doe" 402 by selecting GUI object 401. That is, in response to the user's selection of GUI object 401 in the search results, the device will retrieve a phone number associated with the particular phone contact and initiate a call to John Doe's phone number.

If the search results include a game application having a game name, or keywords in the description, that match the handwritten search query, a GUI object representing the game application, for example "Jungle Game" 406, may be presented. The user may launch the game application by selecting the GUI object 406. In this manner, the user does not have to go through several menu options to look up information and/or perform a desired action or exit an application that may be running on the device. In one aspect, before conducting a search, the device may obtain search criteria specified by the user.

Figure 5:
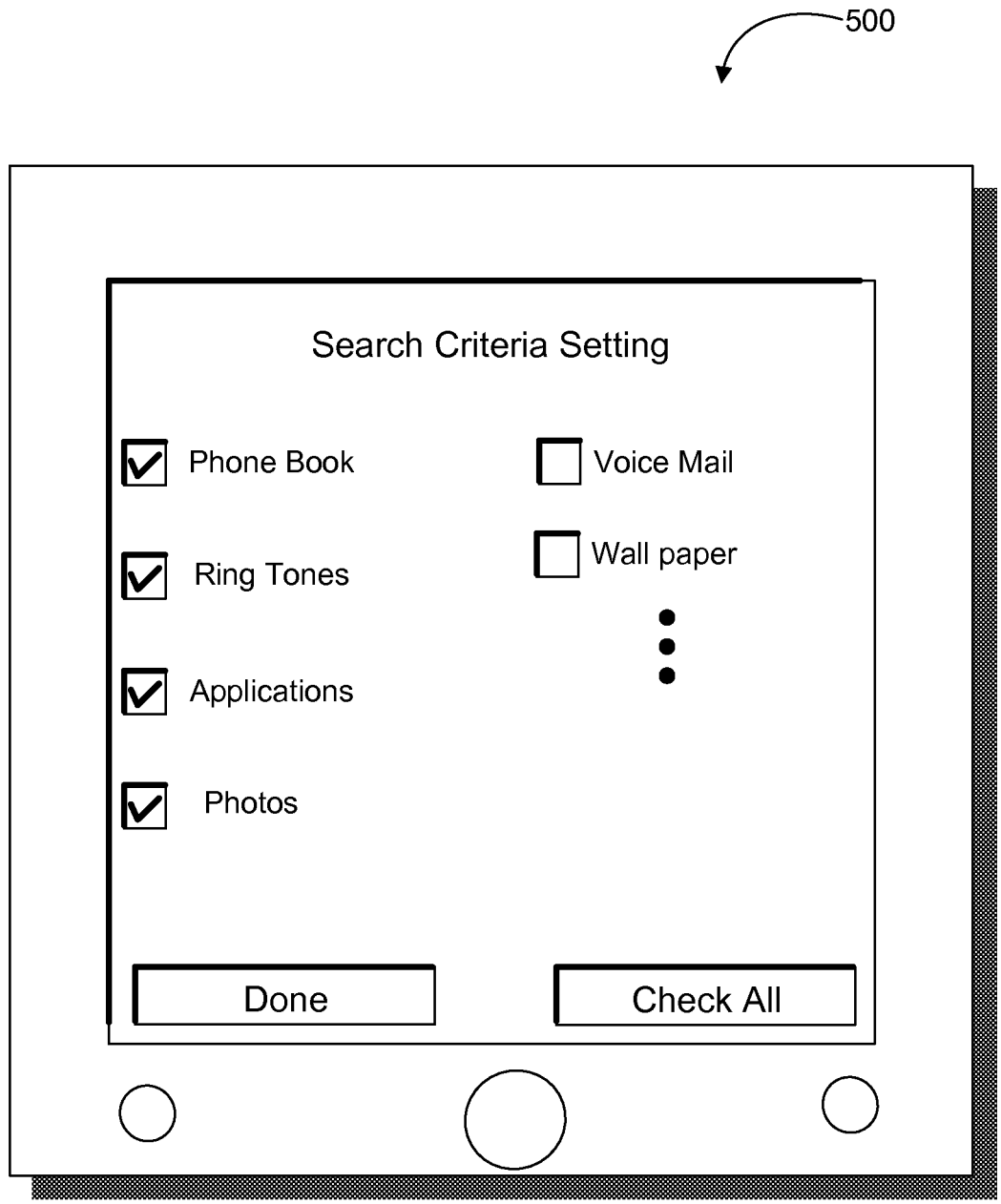
FIG. 5 is an exemplary screen display of a device where a user can customize search criteria.

If there are no search criteria specified by the user, default search criteria may be used to narrow the scope of the search results. In this regard, in some embodiments, a user is allowed to customize the search criteria for the handwriting-initiated search. For example, a user may wish to obtain search results related to contact information but not related to Internet browsing history. For another example, a user may wish to disable or enable the handwriting-initiated search function. An exemplary menu screen for setting up search criteria is depicted in FIG. 5. As shown, a user can select desired categories of information, such as "Phone Book," "Ring Tones", "Applications," "Photos," that will be searched in response to initiation of a handwritten search query. After selection of the desired search criteria, the user can save the customized search criteria on the device. For example, the user may select a "DONE" button to save the customized search criteria, as depicted in FIG. 5. Also, the user can cancel the customized search criteria by selecting a "CANCEL" button. It should be noted that the menu screen and menu options depicted in FIG. 5 are merely an example, and should not be construed as limiting the scope of the described embodiments. Other various search criteria can be customized by a user. In some embodiments, the user can enable or disable the handwriting-initiated search function, select or deselect all available categories, and the like. In one embodiment, the user can specify the user settings to disable the handwriting-initiated search. The user is further able to specify conditions for disabling or enabling of the handwriting-initiated search, such as when a particular application is running. For example, the user may specify the user settings to disable the handwriting-initiated search when the user is on the phone because the user does not want to be interrupted while the user is conversing over the phone. Further, a user can change user settings (including search criteria) for the handwriting-initiated search anytime during the operation of the multifunctional device.

In one aspect, the device is able to identify a handwritten search query regardless of the current operating state of the device. For instance, a user may initiate a handwritten search query while one or more applications are currently running on the device. For example, a user may want to search for a friend's contact information while the user is viewing vacation photos, or a user may want to search a call log relating to a client while an e-mail or text messaging application is currently running on the device. In such cases, the device will recognize the user input over one or more currently running applications (e.g., viewing a photo, writing a text message, etc.) as the initiation of a handwritten search query, will lock and preserve the then-running application(s), and will conduct a search. A new window with a GUI screen presenting the search results may be populated over the locked and preserved window. In this regard, the window for the current application may be continuously running in the background and the status of the application at the time of locking may be preserved so that a user can return and resume the application. Referring back to FIG. 4, when a user selects a "Cancel" button, the current GUI screen presenting the search results is closed and the search results may be temporarily stored in the memory. In one embodiment, upon closing the search results window, the previous window, where the user inputs the handwritten search query, may be displayed so that the user can resume the operation or application that was halted due to the handwritten search query.

In some cases, a user may input to initiate a handwritten search query on a portion of a "common area" where no GUI object or menu option is displayed, and continue such input by sliding his or her finger, stylus, etc., across a single GUI object. As used herein, the term "common area" refers to any space on a screen where no GUI object or menu option that is selectable by user input received through a touch sensitive layer is displayed. In this instance, the device determines that the input is a handwritten search query if the user input starts from the common area and extends over the GUI object, or if the user input is received substantially continuously for a predetermined time after the user input started from the common area while no GUI object is contacted. In such cases, the device may receive user input for a predetermined time period (a long enough time to receive at least one character input) and process the received user input to find a best matching character. In some embodiments, the user may be asked to verify the best matching character, i.e., confirm whether the character is in fact the one that the user wants to use as a handwritten search query. In other embodiments, no user verification will be required. In those embodiments, upon detection of the user input, the device may conduct a search using the best matching character as a handwritten search query and present the search results. In one aspect, the user has a choice to cancel the search or to restart a search by rewriting a character on the search result window. As discussed above, the user can input handwriting to start a search at any operating state of the device.

Figure 6:
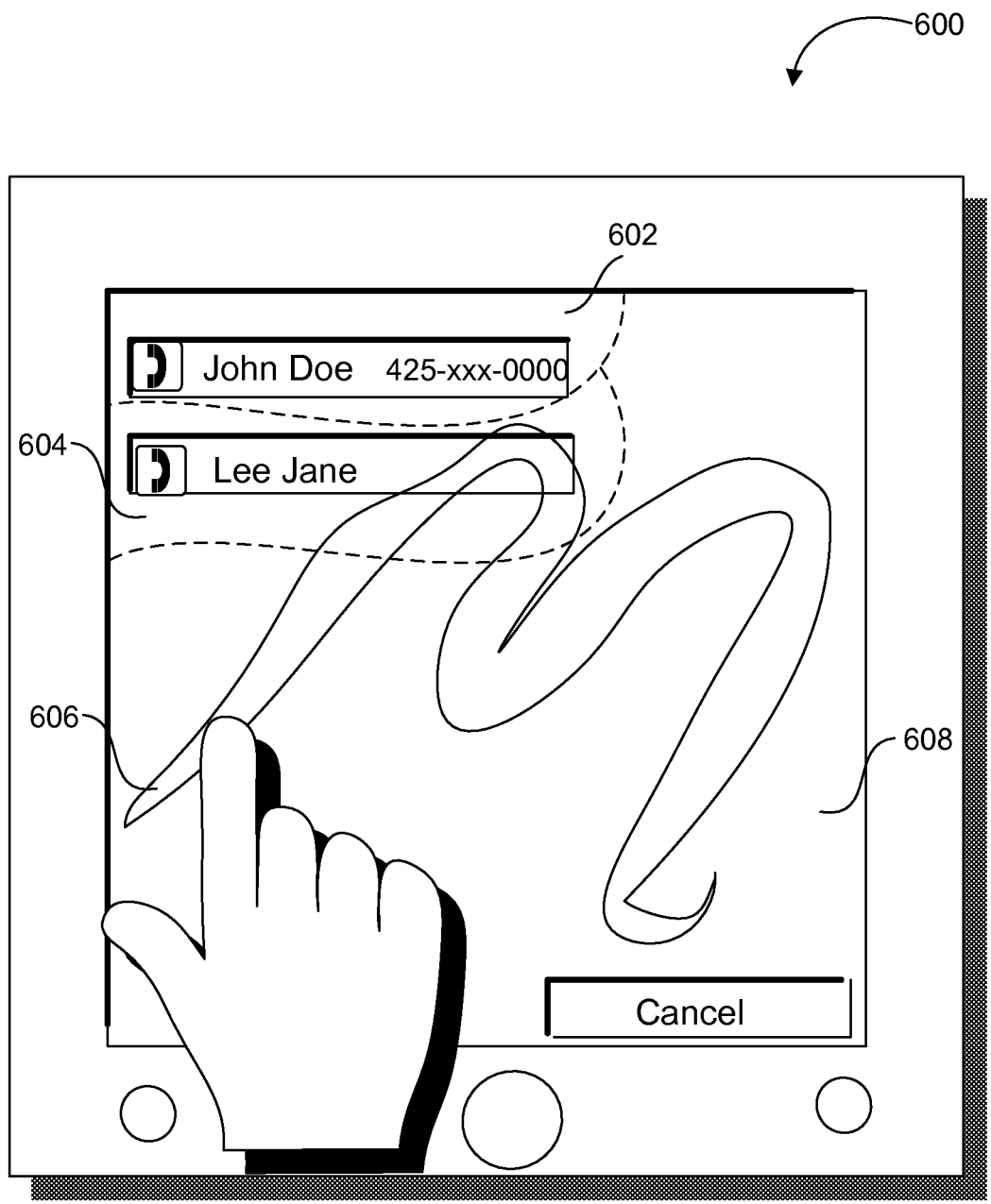
FIG. 6 is another exemplary screen display of a device when a user initiates a search by handwriting a character as a search query, in accordance with some embodiments.
Figure 7:
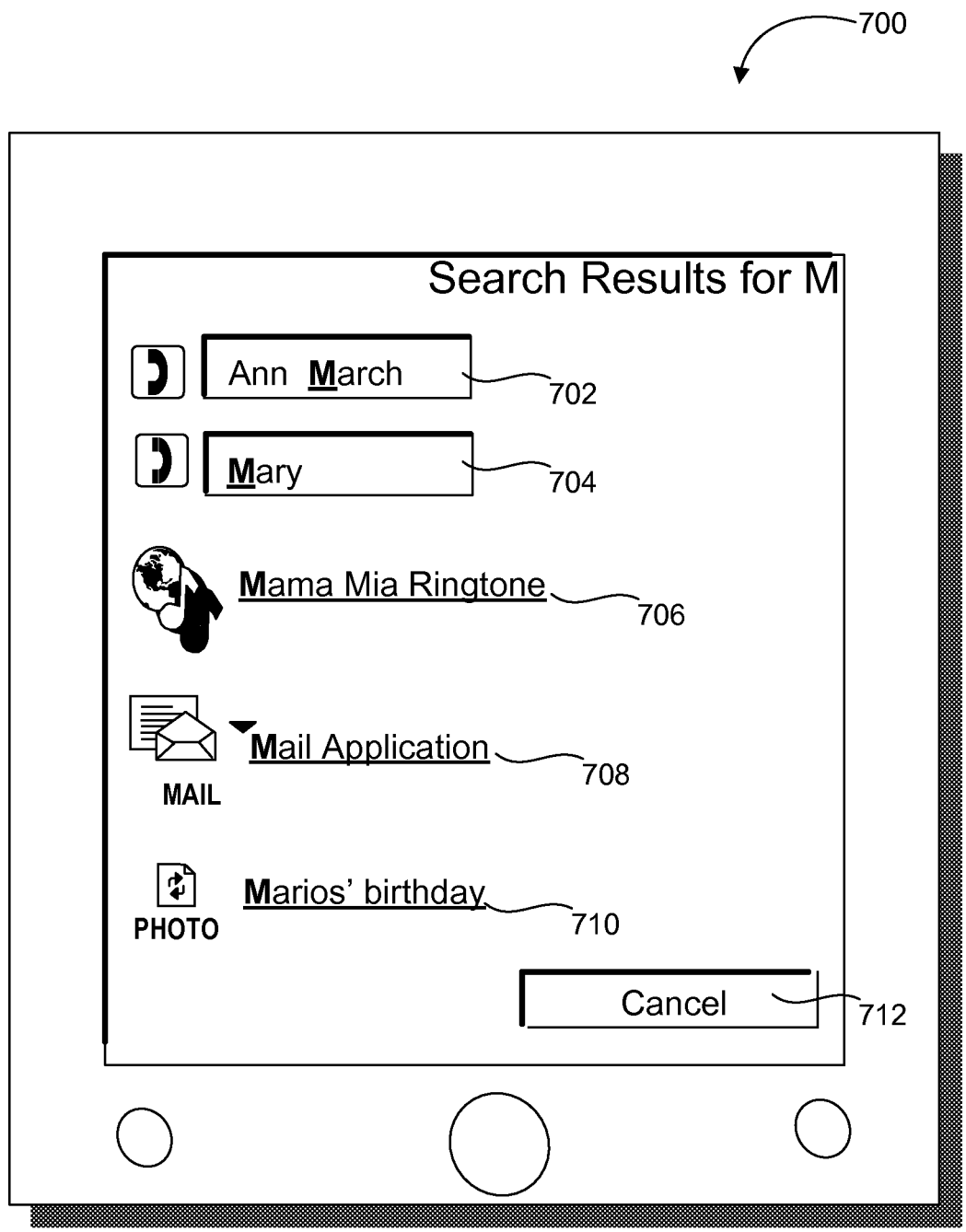
FIG. 7 is another exemplary screen display that presents the search results returned from the search based on the search query shown in FIG. 6, in accordance with some embodiments.

Referring to FIG. 6, an exemplary device screen is illustrated when a user handwrites a character on a screen but only one GUI object is contacted as a result of the user's handwriting in accordance with some embodiments. As shown, the user starts writing the letter "M" 606 on a portion of a common area 608, then continues the writing to touch a GUI object, for example "Lee Jane" 604, and completes the writing in common area 608. Although a GUI object "Lee Jane" 604 can be selected as a result of the user input 606 (because the boundary of the GUI object is selected), the device ignores such selection because the input has been started from the common area. The device conducts a search based upon the perceived handwritten search query, for example a character "M". As shown in FIG. 7, the search results 702-710 are displayed for the user's review. In addition, a "CANCEL" button 712 is provided for the user to go back to the previous screen, to return to a "home" screen, or to allow the user to start a new search.

As will be appreciated, the aforementioned embodiments directed to detecting a handwritten search query are merely examples, and should not be construed as limiting the scope of the described embodiments. It should be well understood that there are several other ways to detect a handwritten search query or to differentiate a handwritten search query from a user's manipulation of a device. By way of example, in some embodiments, the device may assume that the user input is handwriting if the user input covers a threshold percentage of a displayed screen. By way of another example, in some embodiments, the device may assume that the user input is a handwritten search query if the user input is entered on a displayed screen that does not include any GUI or menu objects that are contactable by the user input. For example, a user can start a search while a user is viewing a photo displayed on the screen. In that case, the device treats the displayed photo (screen) as a common area and determines that the user input is handwriting input. Once the device determines that the user input is handwriting, the device tries to find a matching character or symbol based on the user input. In one embodiment, if the device cannot find a character or symbol that meets a threshold level of matching, the device may prompt the user with an error message or ask the user to re-input the handwriting character.

Figure 8:
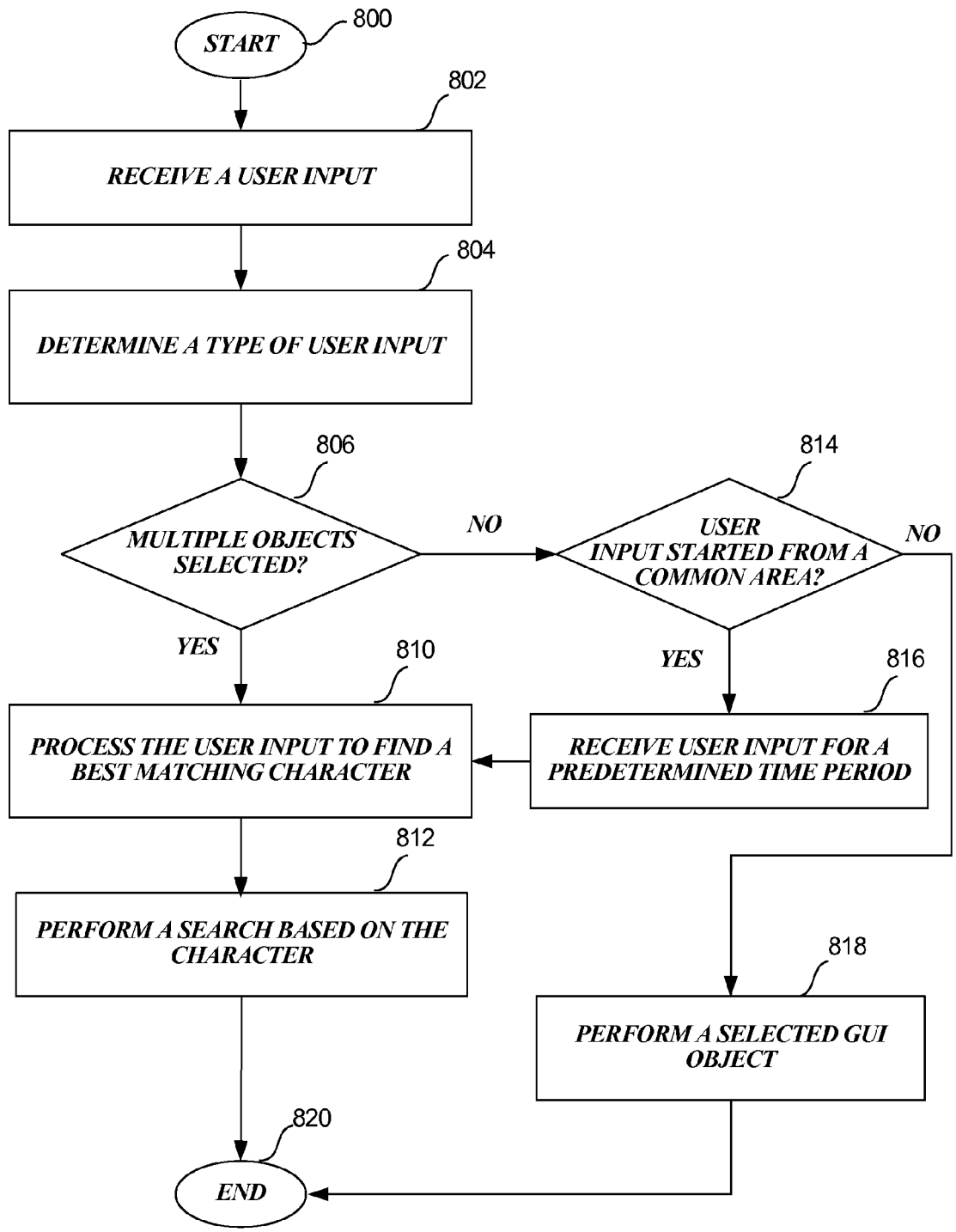
FIG. 8 is a flow diagram of one example of a user input handling routine in accordance with some embodiments.

FIG. 8 is a flow diagram of a user input handling routine 800 in accordance with some embodiments. Generally described, the user input handling routine 800 determines whether the user input is for initiating a handwritten search query or for selecting a GUI object/menu option. Based on the determination, appropriate actions may be performed.

The user input handling routine 800 begins with block 802 where user input is received. At block 804, the type of user input is determined. As will be well understood, there are various types of user inputs. For example, user inputs can be received through soft keys, keyboards, scroll wheels, balls, touch screen, buttons, etc. However, for ease of discussion, limited types of user input are considered in the exemplary user input handling routine. As discussed above, the device includes a touch sensitive layer on the screen to receive user handwriting input on the screen of the device. If the device is not touch screen menu driven, the device detects a handwritten search query as the user writes the character on the screen. If the device is touch screen menu driven, the device differentiates a handwriting input from the user input for selecting a GUI object or a menu option. For ease of discussion, it is assumed that the user input is a selection of a GUI object (an icon, a menu button, any type of a visual indicator, a hyperlink, etc.) displayed on the screen.

In one embodiment, the device recognizes that the user input is handwriting input if the user contacts several GUI objects within a short period of time, as discussed in connection with FIG. 3. At decision block 806, a determination is made as to whether the user input would result in selecting multiple GUI objects (more than one GUI objects) and/or menu options. If it is determined that the user input selects multiple GUI objects and/or menu options for a relatively short period of time, the device assumes that the user intends the input to initiate a handwritten search query and processes the user input to find a best matching character at block 810. At block 812, the device performs a search based on the character. The handwriting-initiated search will be discussed in further detail in connection with FIG. 9.

As discussed above in connection with FIG. 6, in some cases, a user may input a handwritten search query on a "common area" where no GUI object or memo option is displayed. As discussed above, the common area can be any space on the displayed screen where no GUI object or menu option is displayed. For example, a photo display area, a document display area, a particular application running area, or the like can be a common area for the purpose of determining a handwritten search query. One of many ways to differentiate the handwritten search query from a GUI object and/or menu option selection may be that the device assumes that the input is handwriting despite a GUI object and/or menu option being selected if the user input starts from the common area, if some user input is received for a predetermined time after the user input started from the common area, or if a certain percentage of the user input is written on the common area, and so forth. If the user input is received for a predetermined time while no GUI object or menu option is selected, the device may assume that the user input is handwriting and determine that the user is initiating a handwritten search query. As such, if it is determined that the multiple GUI objects have not been selected at decision block 806, a determination is made as to whether the user input has been started from a common area at decision block 814. At decision block 814, if it is determined that the user input has been started from a common area, at block 816 the device assumes that the user intends to handwrite a character to initiate a handwritten search query and receives user input for a predetermined time period. The routine 800 proceeds to block 810 where the device processes the user input to find a best matching character. If it is determined that the user input has not been started from a common area, at block 818 the device performs a function associated with the selected GUI object or menu selection. The routine 800 proceeds to block 820 where it terminates.

Figure 9:
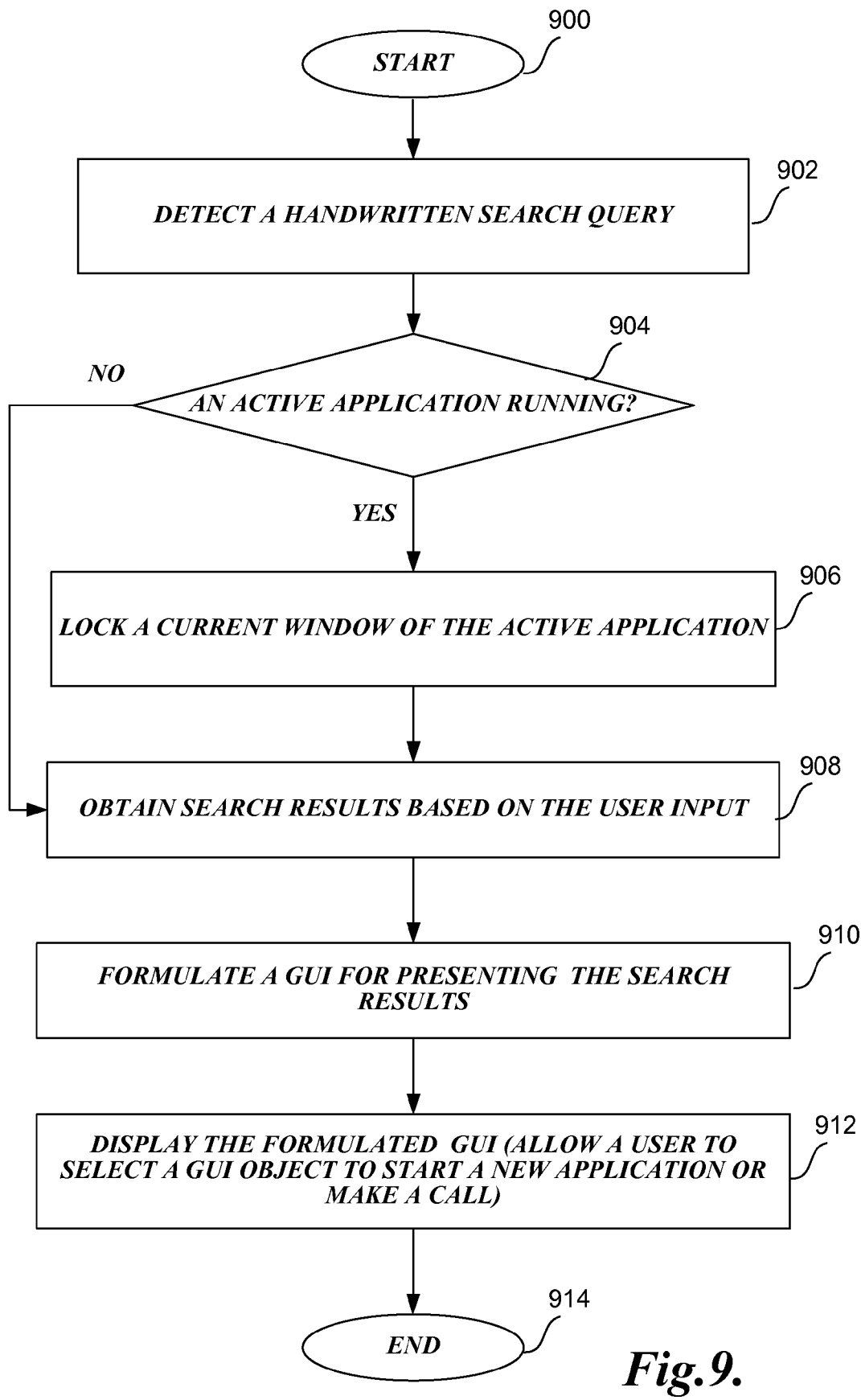
FIG. 9 is a flow diagram of one example of a handwriting-initiated search routine in accordance with some embodiments.

It should be well understood that the user input handling routine 800 described above with reference to FIG. 8 does not show all of the steps and functions performed. Although the user input handling routine 800 generally describes the process when a single character is inputted as a handwritten search query, several characters (e.g., a word, a string, etc.) can be inputted, recognized and used as a handwritten search query. Those skilled in the art and others will recognize that the steps and/or exchanges of data described above may be performed in a different order, omitted/added, or otherwise varied while still achieving the functionality described FIG. 9 is a flow diagram of a handwriting-initiated search routine 900 for conducting a search based on the handwritten search query (as recognized in FIG. 8) and for presenting the search results in accordance with some embodiments. The handwriting-initiated search routine 900 begins with block 902 where the handwritten search query is detected. At decision block 904, a determination is made whether an active application is currently running on the device at the time of the user input. If it is determined that an active application is currently running, at block 906 the current window where the active application is running is locked so that future user inputs related to a search do not affect the application. Information about the current status of the application may be saved. If it is determined that an active application is not currently running on the device (i.e., the device is in an idle state) or following block 908, the device obtains search results after conducting a search based on the handwritten search query. In one embodiment, the device will conduct a search over various databases based on the handwritten search query in accordance with the customized search criteria. As mentioned above, a user may have specified desired search criteria. The search results matching the search query are returned. In a typical embodiment, the device may conduct a search over local databases including contact information, applications, wallpapers, ringtones, photos, other user history information (e.g., call logs, browsing history, etc.), email messages and text messages that are stored locally, and the like. The device may also conduct a search over one or more remote databases maintained by a service provider, including a message database, email message database, photo albums uploaded by the user, contact information, and the like.

As will be well appreciated, there are many ways to conduct a search based on a character. One way is to find database records (entries) including one or more keywords that match the handwritten search query. When the user inputs a letter "M" to initiate a search, the database entries including keywords that start with the letter "M" may be returned as search results. By way of example, in one embodiment, in the contact information database, each database entry may include keywords such as the first name and the last name of a contact. For another example, in the application database, a database entry includes keywords such as the title of the application ("email," "browser," "calculator," "calendar," "notepad," "text message," "monster game," etc.).

Figure 10:
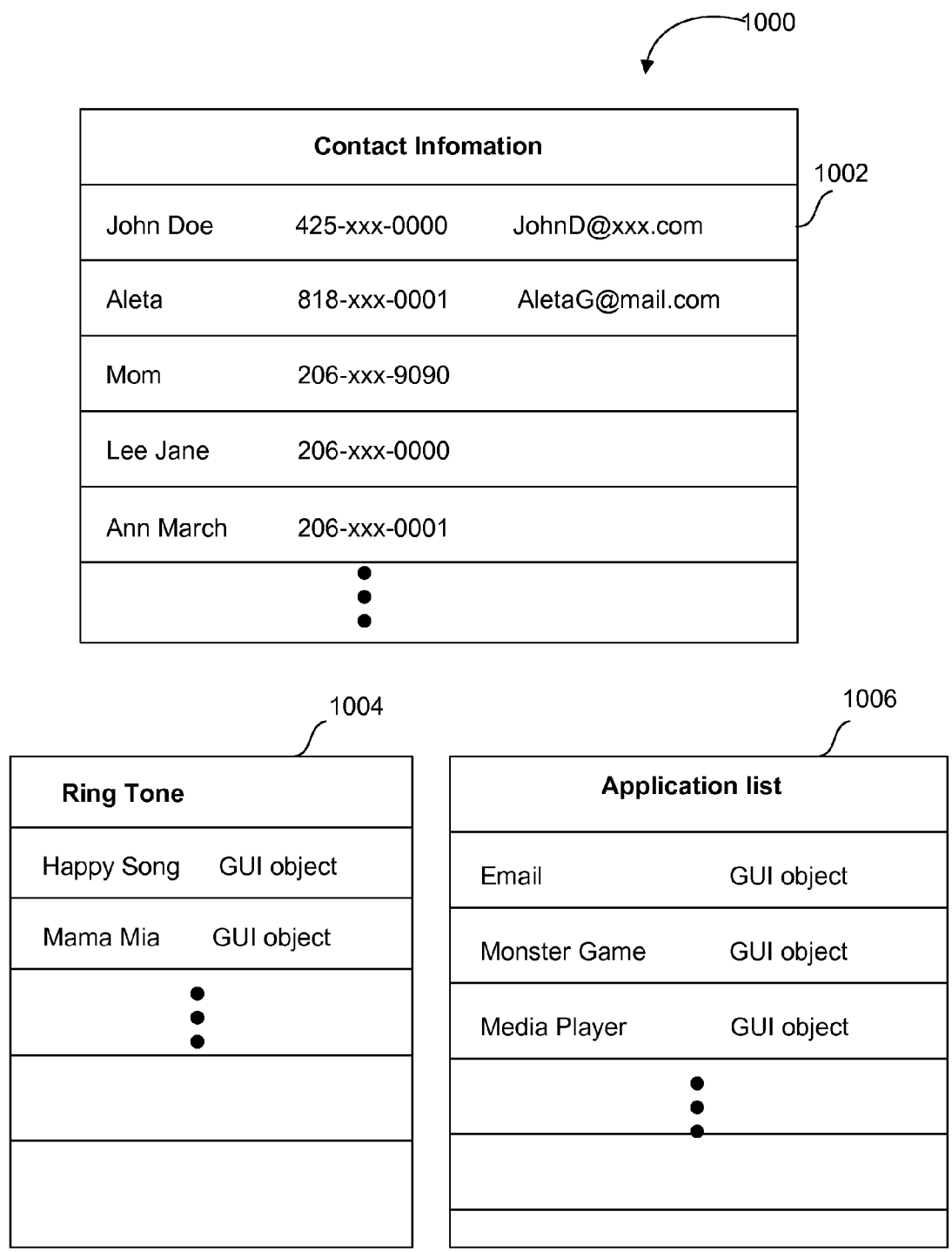
FIG. 10 is a schematic diagram of local databases that can be searched by the device upon detection of the handwritten search query.

In some embodiments, separate index lists of databases are maintained for a fast search. Example databases are depicted in FIG. 10. As will be appreciated, it is simply a design choice how to construct databases to make a search efficient. Thus, further detail of the databases or the construction of the databases will be omitted.

As shown in FIG. 10, for each database 1002-1006, an index list includes information relevant to the handwriting-initiated search, such as keywords that will be matched against the handwritten search query. In some other embodiments, when the databases are constructed, meaningful keywords are parsed from various types of information, for example, but not limited to, browsing history, titles or descriptions of photos, songs, media files, ringtones, and applications, etc. The parsed keywords may be associated with a corresponding database entry in the database.

At block 910, a GUI screen presenting the obtained search results is formulated. In one embodiment, each search result may be represented with a corresponding GUI object (e.g., a visual indicator, icon, memo options, hyperlink, etc.) that can be selected by a user for further operation. Generally described, the device may perform an appropriate action in accordance with a user selection, such as populating a new screen, connecting to a network, listing information, or the like. For example, in response to the user's selection of a GUI object, the device may activate an application associated with the GUI object. Typically, the device retrieves the additional information relevant to activating the application. At block 912, the formulated GUI is displayed to the user. The routine 900 proceeds to block 914 where it terminates. As discussed above, in one embodiment, once the application associated with the selected GUI object is completed or terminated, the device returns the user to the window or screen where the user was prior to entering the handwriting-initiated search character.

It should be well understood that the handwriting-initiated search routine 900 described above with reference to FIG. 9 does not show all of the steps and functions performed. Those skilled in the art and others will recognize that some steps and/or exchanges of data described above may be performed in a different order, omitted/added, or otherwise varied without departing from the scope of the described embodiments.

In some embodiments, the handwriting-initiated search routine 900 can be implemented in multifunctional devices which are not touch screen menu driven. In those embodiments, when the user inputs handwriting, the device recognizes such input is for a handwriting-initiated search, and not for selecting a GUI object for operating the device since selection of a GUI object is accomplished via a different input method such as a keyboard, physical button, track ball or the like.

While illustrative embodiments have been illustrated and described, it will be appreciated that various changes can be made therein without departing from the scope of the invention.

The embodiments of the invention in which an exclusive property or privilege is claimed are defined as follows:

1. A computer implemented method for a handwriting-initiated search wherein the computer implemented method is executed on a multifunctional device, the computer implemented method comprising:
   receiving a user input on a touch sensitive input unit of the multifunctional device;
   determining whether the received user input is a handwriting input on the touch sensitive input unit,
      wherein the handwriting input is differentiated from a selection of a Graphic User Interface (GUI) object,
      wherein the user input is received in an area of the touch sensitive input unit that does not exclusively receive handwriting inputs; and
      wherein the user input is determined to be a handwriting input when more than one GUI objects that are unrelated to an input of handwriting are contacted as a result of the user input;
   upon determination of the handwriting input:
      processing the handwriting input to determine one or more matching characters;
      conducting a search over two or more databases based on the one or more matching characters,
         wherein the two or more databases include at least two different types of data;
      obtaining search results from the conducted search; and
      presenting the search results,
         wherein the presented search results are selectable by the user for performing an action associated with a search result.

2. The computer implemented method of claim 1, wherein the user input is determined to be a handwriting input when the user starts the user input in the area that does not exclusively receive handwriting input.

3. The computer implemented method of claim 1, wherein the user input is determined to be a handwriting input when a percentage of the user input in the area that does not exclusively receive handwriting input is more than a threshold.

4. The computer implemented method of claim 1, wherein the user input is determined to be a handwriting input if no GUI object is contacted as a result of the user input.

5. The computer implemented method of claim 1, wherein the action associated with the search result includes:
   a) establishing a call connection to a contact relating to the search result,
   b) executing an application associated with the search result,
   c) presenting information relating to the search result, or
   d) establishing a connection to a network relating to the search result.

6. The computer implemented method of claim 1, wherein conducting a search over databases includes applying user specified search criteria.

7. The computer implemented method of claim 1, wherein conducting a search over databases includes identifying database entries that include at least one keyword starting with a matching character.

8. The computer implemented method of claim 1, further comprising receiving a user selection of a search result, wherein in response to the user selection of a search result, an action associated with the search result is performed.

9. The computer implemented method of claim 1, wherein the databases searched include at least one from contact information, application information, wallpaper information, media information, call history information, text and voice message information, browsing history information, and ringtone information.

10. The computer implemented method of claim 1, further comprising, before presenting search results, suspending an application running on the multifunctional device.

11. The computer implemented method of claim 10, wherein a window displaying the suspended application runs in the background and the suspended application is resumed after a window displaying the search results is closed.

12. A computing device for performing a handwriting-initiated search, the computing device comprising:
   a touch sensitive input unit for receiving a user input, wherein the user input is received in an area of the touch sensitive input that does not exclusively receive handwriting inputs;

at least one memory unit for storing a plurality of databases;

a processor operable to:

determine whether the received user input is a handwriting input on the touch sensitive input unit, wherein the handwriting input is differentiated from a selection of the GUI object, and wherein the user input is determined to be a handwriting input when the user input contacts more than one GUI objects that are unrelated to an input of handwriting;

in response to the handwriting input, process the handwriting input to identify one or more matching characters;

conduct a search over two or more databases based on the one or more matching characters, wherein the two or more databases include at least two different types of data;

obtain search results; and formulate a graphical user interface displaying the search results; and a display unit for displaying the formulated graphical user interface, wherein each displayed search result is selectable by the user for performing an action associated with the search result.

13. The computing device of claim 12, wherein the processor is operable to suspend an application running on the computing device, and lock a first window of the computing device that displays the suspended application while the user handwriting input is received from the user.

14. The computing device of claim 13, wherein the first window runs in the background and the suspended application is resumed after the formulated graphical user interface is closed.

15. The computing device of claim 12, wherein the user input is determined to be a handwriting input when the user input has been started from the area that does not exclusively receive handwriting inputs.

16. The computing device of claim 12, wherein the processor is operable to receive the user input for a predetermined time when the user input has been started from the area that does not exclusively receive handwriting input.

17. The computing device of claim 12, wherein the processor is operable to apply user specified search criteria.

18. The computing device of claim 12, wherein the processor is operable to find database entries that include at least one keyword starting with the one or more matching characters.

19. The computing device of claim 12, wherein the processor is operable to receive user selection of a search result, wherein, in response to the user selection of a search result, an action associated with the search result is performed.

20. A non-transitory computer-readable storage medium having instructions encoded thereon to conduct a search based on a handwritten search query, wherein the instructions, when executed by a computing device, cause the computing device to:

receive a user input through a first window displayed on a touch sensitive screen of the computing device, wherein a selectable menu object is selectable within the first window;

determine whether the received user input is a handwritten search query or selection of the selectable menu object, wherein the user input is determined to be a handwritten search query when the user input contacts more than one Graphical User Interface (GUI) objects displayed on the first window that are unrelated to the input of handwriting;

in response to receipt of the handwritten search query:

conduct a search over two or more databases based on the handwritten search query, wherein the two or more databases include at least two different types of data; and present a second window displaying search results obtained from the search over the first window, wherein the displayed search results are selectable by the user for performing an action associated with a search result.

21. The non-transitory computer-readable storage medium of claim 20, wherein the two or more databases include at least one of contact information, application information, wallpaper information, media information, call history information, text and voice message information, browsing history information, and ringtone information.

22. The non-transitory computer-readable storage medium of claim 20, wherein the user input is determined to be a handwritten search query when the received user input has started from an area displayed in the first window that does not exclusively receive handwriting inputs.

23. The non-transitory computer-readable storage medium of claim 22, wherein the area has no selectable menu object displayed.

24. The non-transitory computer-readable storage medium of claim 20, wherein the selectable menu object is a GUI object, an icon, a menu option, a hypertext link, or a command button that is selectable by the user input through the touch sensitive screen.

25. The non-transitory computer-readable storage medium of claim 20, wherein the user input is determined to be a handwritten search query when the received user input covers a threshold percentage of the first window.

* * * * *